United States Patent [19]

Scaramucci

[11] 4,252,144
[45] Feb. 24, 1981

[54] TILTING DISK CHECK VALVE

[76] Inventor: Domer Scaramucci, 3245 S. Hattie, Oklahoma City, Okla. 73129

[21] Appl. No.: 35,783

[22] Filed: May 3, 1979

[51] Int. Cl.³ .............................................. F16K 15/03
[52] U.S. Cl. ................................. 137/454.6; 137/527.2
[58] Field of Search .................. 137/454.6, 527, 527.2, 137/527.4, 527.8; 251/298, 299

[56] References Cited

U.S. PATENT DOCUMENTS

| | | | |
|---|---|---|---|
| 485,745 | 11/1892 | Loveland | 137/527.2 |
| 556,636 | 3/1896 | Kuichling et al. | 137/527.2 |
| 1,647,036 | 10/1927 | Dileo | 251/298 |
| 2,844,164 | 7/1958 | Robbins | 137/454.6 |
| 2,923,317 | 2/1960 | McInerney | 137/527.2 |
| 2,928,416 | 3/1960 | Balhouse | 137/527.8 |
| 3,119,594 | 1/1964 | Heggem | 251/298 |
| 3,817,277 | 6/1974 | Wheatley | 137/527.8 |

FOREIGN PATENT DOCUMENTS

| | | | |
|---|---|---|---|
| 1806409 | 9/1969 | Fed. Rep. of Germany | 137/527.8 |
| 1182255 | 6/1959 | France | 251/298 |
| 4412462 | 6/1965 | Japan | 137/454.6 |

*Primary Examiner*—William R. Cline
*Assistant Examiner*—H. Jay Spiegel
*Attorney, Agent, or Firm*—Dunlap, Codding & McCarthy

[57] ABSTRACT

A tilting disc check valve wherein a valve module containing the tilting disc is positioned adjacent the inlet of the valve into a valve chamber by a cradle formed by a portion of the interior surface of the wall of the valve chamber and an arcuate ridge formed on such interior surface and spaced a distance from the inlet. A threaded port is formed through the wall of the valve chamber opposite the ridge and a bung, screwed into the port, closes the port and bears against the valve module to seat the module in the cradle provided for the module.

16 Claims, 9 Drawing Figures

TILTING DISK CHECK VALVE

CROSS REFERENCE TO RELATED APPLICATION

The subject matter of the present application is related to the subject matter disclosed in the applicant's copending U.S. Patent Application Serial No. 14,124, filed Feb. 22, 1979, entitled "An Improved Tilting Disk Check Valve".

BACKGROUND OF THE INVENTION

1. Field of the Invention

This invention relates generally to improvements in tilting disk check valves and, more particularly, but not by way of limitation, to improvements facilitating rapid repair of valves which have become worn in use.

2. Discussion of the Prior Art

In many industrial processes, it is necessary to provide for unidirectional flow through a number of conduits which transport fluids about plants wherein the processes are carred out. Where the conduits have relatively large diameters, it is common to use check valves of the tilting disk type for this purpose. Such valves generally provide dependable service at reasonable cost and are, accordingly, in widespread use.

A tilting disk check valve generally comprises a clapper pivotally mounted within the body of the valve to pivot forward or away from an annular seat. Fluid flow from one side of the clapper forces the clapper away from the seat to permit passage of the fluid to the valve while backflow is prevented by pivotation of the clapper against the seat. While tilting disk check valves have proven themselves to be useful and dependable devices, they are, as is the case with any type of valve, subject to wear so that periodic repair of the valve is necessary to prevent backflow leakage. This repair results in down time for processes using fluid transported by the conduits wherein the valves are disposed and this down time can represent a considerable expense over a period of time, especially where a large number of check valves are utilized in a manufacturing process. For this reason, it is desirable that valves of this type be repairable in as short a time as possible to minimize down time for manufacturing operations.

SUMMARY OF THE INVENTION

The present invention provides a tilting disk check valve which can be rapidly repaired in the field by replacing a valve module which includes the clapper of the valve. The body of the valve has a valve chamber into which inlet and outlet passages open and a cradle is formed in the valve chamber adjacent the opening of the inlet passage into the valve chamber to support the valve module. A screw threaded bung fits a port formed in the wall of the valve chamber opposite the cradle and the bung can be screwed down on the valve module to seat the valve module in the cradle. Repair of the valve is rapidly accomplished by screwing the bung out of the port, replacing a worn valve module with a new module, and screwing the bung back into the port.

An object of the present invention is to minimize down time for manufacturing processes wherein tilting disk check valves are utilized in fluid conduits to provide unidirectional flow.

Another object of the invention is to provide a simple means for repairing a tilting disk check valve in the field.

Yet a further object of the invention is to provide a tilting disk check valve wherein repair can be accomplished by rapid replacement of a module forming a portion of the valve.

Other objects, advantages and features of the present invention will become clear from the following detailed description of the preferred embodiments of the invention when read in conjunction with the drawings and appended claims.

DESCRIPTION OF FIGS. 1, 2, 3 AND 4

Figure 1:
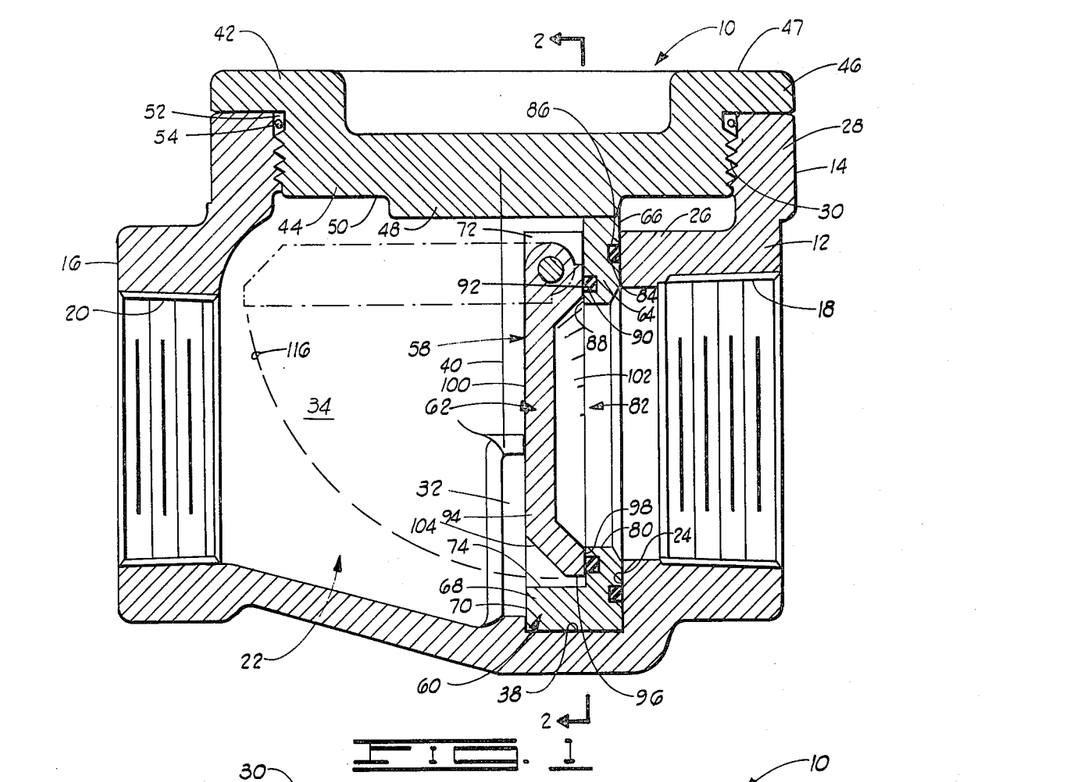
FIG. 1 is a cross-section in side elevation of a tilting disk check valve constructed in accordance with the present invention.
Figure 2:
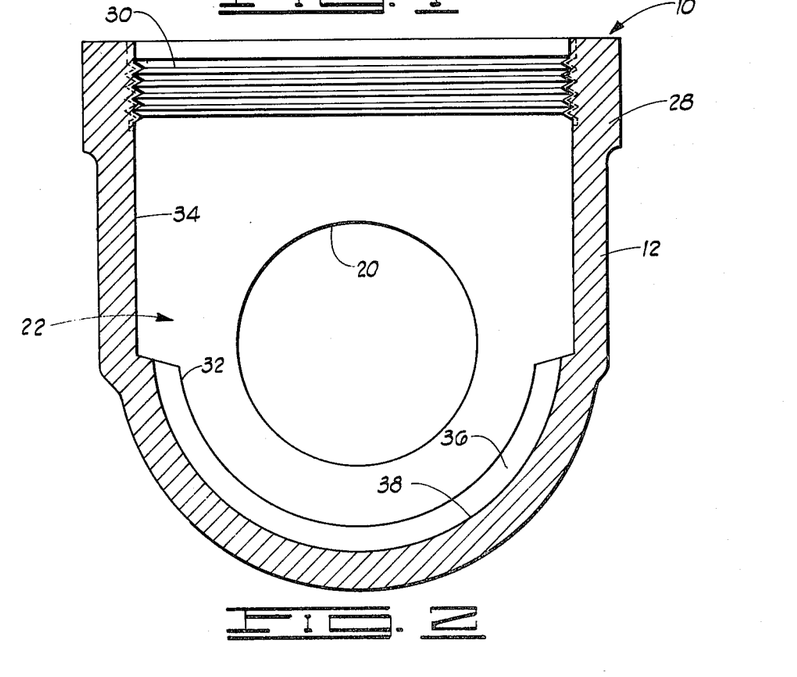
FIG. 2 is a cross section of the valve body taken along line 2—2 of FIG. 1.

Referring now to the drawings in general and to FIGS. 1 and 2 in particular, shown therein and designated by the general reference numeral 10 is a tilting disk check valve constructed in accordance with the present invention. The valve 10 includes a valve body 12 having generally opposing first and second ends, 14 and 16 respectively, wherein are formed an inlet passage 18 and an outlet passage 20. The inlet passage 18 intersects the first end of the valve body 12 and extends into the valve body 12 to open into a valve chamber 22 formed in medial portions of the valve body 12. An annular valve module sealing face 24 is formed about the opening of the inlet passage 18 into the valve chamber 22 for a purpose to be described below. The outlet passage 20 intersects the second end 16 of the valve body 12 and extends into the valve body 12 to open into the valve chamber 22 generally oppositely to the opening of the inlet passage 18 into the valve chamber 22. The inlet passage 18 and outlet passage 20 can be internally threaded as has been indicated in FIG. 1 to provide a means for connecting the valve into a conduit utilized for transporting a fluid. As has been indicated in FIG. 2, portions of the valve body 12 defining the valve chamber 22, between the openings of the inlet passage 18 and the outlet passage 20 thereinto, have a generally U-shaped cross section. The inlet passage 18 is formed through a protruberance 26 (see FIG. 1) extending into the valve chamber 22 along the base of the U so that the portion of the valve chamber 22 defined by the upper portion of the U extends nearly to the first end 14 of the valve body 12. The upper portion of the U is capped with a laterally extending projection 28 through which is formed an internally threaded, circular module insertion port 30 opening into the valve chamber 22 laterally of the valve module sealing face 24.

Opposite the module insertion port 30, an arcuate ridge 32 is formed on the inner wall 34 of the valve chamber 22 to form a valve module cradle adjacent the valve module sealing face 24. The ridge 32, which is substantially semi-circular so as to extend substantially along the entire base of the U-shaped cross section of the valve chamber 22, is spaced a preselected distance toward the second end 16 of the valve body 12 from the valve module sealing face 24 and the side 36 (see FIG. 2) of the ridge 32 facing the valve module sealing face 24 is formed on a plane which is parallel to the valve module sealing face 24. The valve module cradle is defined by the side 36 of the ridge 32, portions of the valve module sealing face 24 opposite the side 36, and a portion 38 of the inner wall 34 of the valve chamber 22 between the ridge 32 and the valve module sealing face 24. The portion 38 of the inner wall 34 of the valve chamber 22 is shaped to conform to a portion of the periphery of a right circular cylinder having a diameter which is less than the diameter of the module insertion port 30. Specifically, the axis 40 of the module insertion port 30 is aligned with the ridge 32 and the diameter of the port 30 and the radius of curvature of the portion 38 of the inner wall 34 are selected such that a cylindrical object, having a height equal to the spacing between the ridge 32 and the valve module sealing face 24 and a radius equal to the radius of curvature of the portion 38 of wall 34, can be inserted into the valve module cradle via the module insertion port 30.

A circular bung 42 having a portion 44 sized to mate with the module insertion port 30 and having external threads to mate with threads in the port 30 is utilized to close the port 30 in the assembled valve 10. A flange 46 is formed adjacent one side 47 of the bung 42 to engage the end of the projection 28 so as to position the bung 42 on the valve body 12 and a circular protuberance 48 is formed concentrically with the threaded portion 44 on the opposite side 50 of the bung 42 for a purpose to be described below.

A length of the threaded portion 44 of the bung 42, adjacent the flange 46, is left unthreaded and a portion of the module insertion port near the end of the projection 28 is similarly left unthreaded to form an annular cavity 52 about the threaded portion 44 of the bung 42 adjacent the flange 46. A seal is affected between the bung 42 and the valve body 12 via an elastomeric sealing ring 54, such as an O ring or the like, disposed in the cavity 52.

Figure 3:
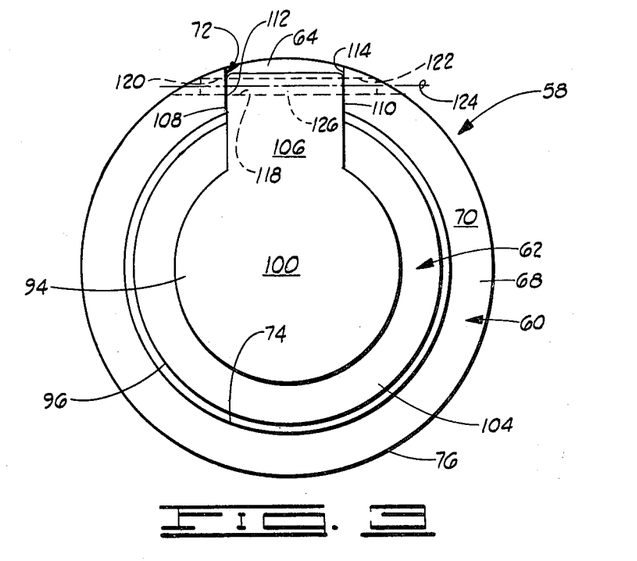
FIG. 3 is a rear elevational view of one embodiment of the valve module of the valve of FIG. 1.
Figures 4, 5:
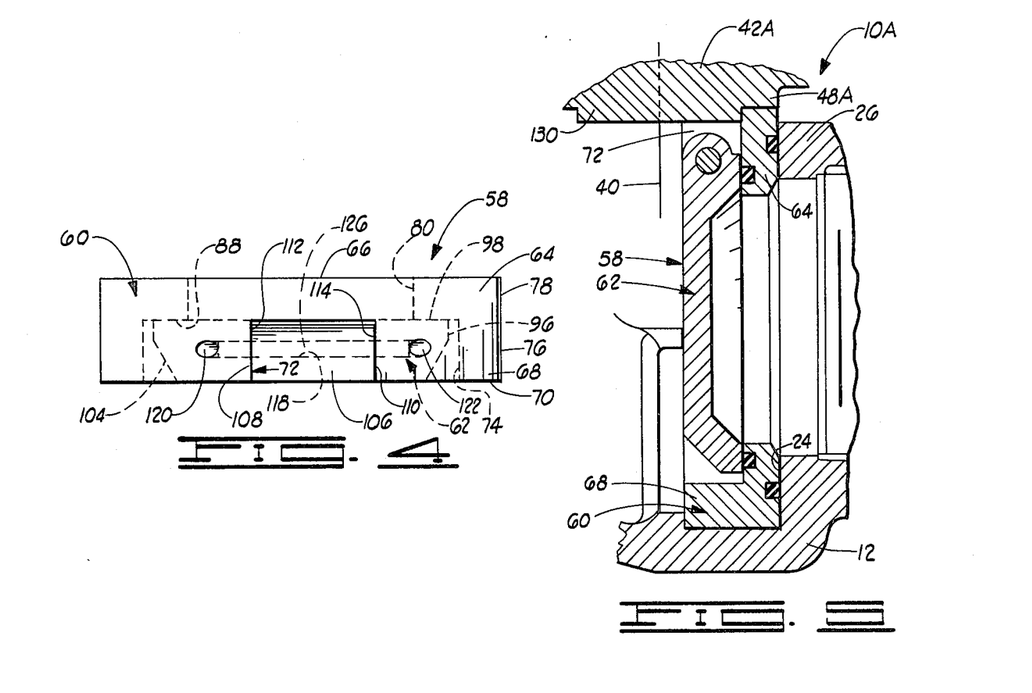
FIG. 4 is a plan view of the valve module shown in FIG. 3.
FIG. 5 is a partial cross section of a valve similar to the valve of FIG. 1 illustrating a modification of the bung of the valve for providing a different manner of seating the valve module in the valve module cradle.

The valve 10 further comprises a valve module 58 which is shown in cross section in FIG. 1 and which has been further illustrated in FIGS. 3 and 4. The valve module 58 comprises a module body 60 and a clapper 62 pivotally mounted thereon as will be described below. The module body 60 comprises two portions: a ring shaped seal portion 64 extending from a first side 66 of the module body 60 to a medial portion thereof and a clapper support portion 68 extending from the seal portion to a second side 70 of the module body 60. As is shown in FIGS. 3 and 4, the clapper support portion 68 has the form of a portion of a ring, the clapper support portion 68 extending arcuately through the major part of a circle to form a gap 72 in the generally ring shaped configuration of the clapper support portion 68. The gap 72 intersects the second side 70 of the module body 60 and extends, between the inner and outer peripheries 74 and 76 of the clapper support portion 68, from the second side 70 to the seal portion 64. The diameter of the outer periphery 78 of the seal portion 64 of the module body 60 is the same as the diameter of the outer periphery 76 of the clapper support portion 68 and the seal portion 64 is disposed co-axially with the clapper support portion 68 so that the seal portion 64 and clapper support portion 68 present a common cylindrical periphery interrupted by the gap 72 formed in the clapper support portion 68. The sides 66 and 70 of the module body are disposed on substantially parallel planes which are perpendicular to the common axis of the outer peripheries 76, 78 of the clapper support portion 68 and seal portion 64 respectively so that the module body 60 is bounded by a disc-shaped surface. In particular, the disc-shaped surface bounding the module body 60 has a radius substantially equal to the radius of curvature of the portion 38 of wall 34 of the valve chamber 22 forming a portion of the valve module cradle and the height of the bounding surface for the module body 60 is substantially equal to the spacing between the ridge 32 and the valve module sealing face 24 so that the module body 60 can be inserted through the module insertion port 30 and into the valve module cradle to a seated position shown in FIG. 1. The module body 60 is positioned, in the assembled valve 10, with the first side 66 thereof abutting the valve module sealing face 24 and with the gap 72 generally adjacent the bung 42. As will be clear from FIG. 3, the seal portion 64 will extend radially outwardly of the clapper support portion 68 toward the bung 42 when the module body 60 is so placed because of the presence of the gap 72 and the common diameters of the seal portion 64 and the clapper support portion 68. In one preferred embodiment, shown in FIG. 1, the circular protuberance 48 on the bung 42 is formed on a diameter sufficient to overlay the seal portion 64 and the height of the protuberance 48 is selected to engage the periphery 78 of the seal portion 64 so as to force the module body 60 into a seated condition of the module body 60 wherein the module body 60 is in the seated position shown in FIG. 1 and wherein portions of the common periphery 76, 78 of the module body 60 engage and extend along the circular portion 38 of the wall 34 of the valve chamber 22.

The seal portion 64 has an inner periphery 80 which is co-axial with the inner periphery 74 of the clapper support portion 68 of the module body 60 and the inner peripheries 74 and 80 cooperate to form a flow passage 82 through the module body 60 as has been indicated in FIG. 1. The inlet passage 18 to the valve chamber 22 is positioned in the protruberance 26 through which the inlet passage 18 is formed to align with the flow passage 82 in the seated condition of the module body 60 and the diameter of the inlet passage 18 can be slightly larger than the diameter of the inner periphery 80 of the seal portion 64 to provide for substantially unimpeded fluid flow from a conduit, screwed into the inlet passage 18, into the flow passage 82.

In order to prevent leakage of fluid between the first side 66 of the module body 60 and the valve module sealing face 24 in the assembled valve 10; that is, to prevent leakage around the valve module 58, an annular groove 84 is formed in the first side 66 of the module body 60 concentrically with the flow passage 82 and on a diameter such that the groove 84 is overlaid by the valve module sealing face 24 in the seated condition of the module body 60. An elastomeric sealing ring 86 is disposed in the groove 84 to effect a seal between the valve module 58 and the valve module sealing face 24 in the assembled valve 10.

As has been shown in FIG. 1, and indicated in dashed lines in FIG. 4, the inner periphery 80 of the seal portion 64 of the module body 60 is formed on a smaller diameter than is the inner periphery 74 of the clapper support portion 68 so that the seal portion 64 extends radially inwardly of the inner periphery 74 of the clapper support portion 68. That is, an annular, planar interior face 88 is formed on the seal portion 64 between the inner periphery 80 thereof and the inner periphery 74 of the clapper support portion 68 of the module body 60. An annular groove 90, extending about the inner periphery 80 of the seal portion 64, is formed in the interior face 88 of the seal portion 64 and an elastomeric sealing ring 92 is disposed in the groove 90 to form a seal with the clapper 62 as will be described below.

As is more particularly shown in FIGS. 1 and 3, the clapper 62 has a generally disc shaped portion 94 having an outer periphery 96 formed on a diameter which is smaller than the diameter of the inner periphery 74 of the clapper support portion 68 of the module body 60 and which is larger than the diameter of the inner periphery 80 of the seal portion 64 of the module body 60. (FIG. 1) The clapper 62 is pivotally mounted on the clapper support portion 68 of the module body 60, as will be described below, to pivot to a closed position shown in FIG. 1 wherein the disc shaped portion 94 of the clapper 62 is disposed within portions of the flow passage 82 defined by the inner periphery 74 of the clapper support portion 68. The disc shaped portion 94 has a planar first side 98 and a planar second side 100 substantially parallel to the first side 98. In the assembled valve module 58 and in the closed position of the clapper 62, the clapper 62 is positioned so that planar portions of the first side 98 thereof overlay the groove 90 as has been shown in FIG. 1 so that the clapper 62 obstructs the flow passage 82 and a seal is formed between the first side 98 of the disc shaped portion 94 of the clapper 62 and the elastomeric sealing ring 92 mounted on the interior face 88 of the seal portion 64 of the module body 60. A central cavity 102 can be formed in the first side 98 of the disc shaped portion 94 of the clapper 62 and a chamber 104 can be formed about the outer periphery 96 thereof at the second side 100 to reduce the weight of the clapper 62 such that the clapper can be easily pivoted away from the closed position by fluid pressure exerted via the inlet passage 18.

The clapper 62 is pivotally connected to the clapper support portion 68 of the module body 60 via a tab 106 (see FIGS. 3 and 4) formed on the outer periphery 96 of the disc shaped portion 94 of the clapper 62, the tab 106 extending substantially radially from the disc shaped portion 94 and into the gap 72 formed in the clapper support portion 68 of the module body 60. The sides 108, 110 of the tab 106 and the sides 112, 114 of the gap 72 are planar and substantially parallel and the width of the tab 106 is slightly smaller than the width of the gap 72. The sides 112, 114 of the gap 72 extend substantially perpendicularly to the second side 70 of the module body 60, and parallel to the axis of the flow passage 82, so that the clapper 62 can pivot about the tab 106 along an arc 116 (see FIG. 1) to a position wherein the disc shaped portion 94 of the clapper 62 extends substantially perpendicularly from the second side 70 of the module body 60 as has been indicated in phantom lines in FIG. 1.

The manner in which the tab 106 is pivotally connected to the module body 60 has been shown in FIGS. 3 and 4. For this purpose, a circular hole 118 is formed transversely to the tab 106 and holes 120, 122, having substantially the same diameter as the hole 118, are formed in portions of the clapper support portion 68 of the module body 60 to either side of the gap 72. The holes 120, 122 are formed about a common axis 124 (FIG. 3) which is perpendicular to the sides 112, 114 of the gap 72 and which is parallel to the second side 70 of the module body 60. A pin 126 passes through the holes 118, 120 and 122 to pivotally mount the clapper on the module body 60. The hole 118 is positioned in the tab 106 and the axis 124 is positioned in the clapper support portion 68 of the module body 60 so that, as has been shown in FIG. 1, the first side 98 of the disc shaped portion 94 of the clapper 62 will be flush with the interior face 88 of the seal portion 64 of the module body 60 in the closed condition of the clapper 62.

OPERATION OF FIGS. 1, 2, 3 AND 4

The above described construction of the valve 10 permits rapid repair of the valve 10 without removing the valve body 12 from a conduit wherein the valve 10 is disposed. In particular, access to a worn valve module 58 is had by unscrewing the bung 42 from the module insertion port 30. With the bung 42 is removed from the valve body 12, the valve module 58 can be grasped and drawn laterally from the valve module cradle and out of the valve chamber 22 via the module insertion port 30. A new valve module 58 can then be inserted into the valve module cradle, via the valve module insertion port 30, by sliding the new valve module 58 along the valve module sealing face 24 and into the valve module cradle. The bung 42 is then screwed into the module insertion port 30 so that the protruberance 48 engages the periphery 78 of the seal portion 64 of the module body 60 and forces the module body firmly against the portion 38 of the valve chamber wall 34 forming a portion of the valve module cradle. The side 36 of the ridge 32 facing the valve module sealing face 24 engages the second side 70 of the module body 60 and axially supports the module body 60 against the valve module sealing face 24 so that a seal is formed between the module body 60 and the valve module sealing face 24 with the result that fluid flow through the valve 10 must pass through the flow passage 82 of the valve module 58.

Where fluid pressure is applied at the inlet passage 18, such pressure bears against the first side 98 of the disc shaped portion 94 of the clapper 62 to force the disc shaped portion 94 out of the flow passage 82 to a position such as that shown in phantom lines in FIG. 1. In such position of the clapper 62, a flow path exists through the valve chamber 22 from the inlet passage 18 to the outlet passage 20 via the flow passage 82 of the valve module 58 and the valve chamber 22 so that fluid will flow through the valve 10. When fluid pressure is applied at the outlet passage 20, the weight of the disc shaped portion 94 of the clapper 62 pivots the clapper 62 to the closed position wherein the first side 98 of the disc shaped portion 94 engages the interior face 88 of the seal portion 64 of the module body 60 to occlude the flow passage 82. Fluid pressure in the outlet passage 20 and, accordingly, in the valve chamber 22 forces the first side 98 of the disc shaped portion 94 of the clapper 62 against the elastomeric sealing ring 92 to form a tight seal about the flow passage 82 to prevent backflow through the valve 10 from the outlet passage 20 to the inlet passage 18.

The mounting of elastomeric sealing rings 86 and 92 on the valve module 58 enhances the rapid repair capability of the valve 10. In some cases, the loss of sealing capability of the valve 10 will be occasioned by wear, damage or corrosion of the sealing rings 86 and 92 arising from the application to which the valve is put. The mounting of sealing rings, such as the sealing rings 86 and 92, on the valve module 58 rather than on portions of the valve body 12, limits the length of time during which a conduit need be out of service when the loss of sealing capability stems from the sealing rings. In such a case, the valve module 58 is replaced as described above so that the conduit in which the valve 10 is disposed suffers little down time and the valve module 58 removed from the valve 10 can then be refurbished at leisure.

DESCRIPTION OF FIG. 5

Referring now to FIG. 5, shown therein is a partial cross section of a valve, designated 10A, having a modified bung, designated 42A in FIG. 5. Other portions of the valve 10A are identical to corresponding portions of the valve 10 and have been numerically designated in FIG. 5 by numerals used to designate such portions in the description of the valve 10.

In the valve 10A, a circular protruberance 48A is formed on the bung 42A in the same manner that the protruberance 48 is formed on the bung 42 in the valve 10 to engage and seat the seal portion 64 of the module body 60 in the valve module cradle. A second circular protruberance 130 is formed on the protruberance 48A and extends therefrom toward the valve module cradle concentrically with the protruberance 48A. The protruberance 130 is formed on a diameter sufficient only to overlay the gap 72 formed in the clapper support portion 68 when the valve 10 is assembled so that the periphery of the protruberance 130 engages portions of the seal portion 64 of the module body 60 adjacent the gap 72 to provide additional axial support for the valve module 58 against the valve module sealing face 24. The length of the protruberance 130 is such that the protruberance 130 engages portions of the clapper support portion 68 to either side of the gap 72 further enhancing seating of the valve module 58 in the valve module cradle. The repair and operation of the valve 10A are the same as the repair and operation of the valve 10.

Figure 6:
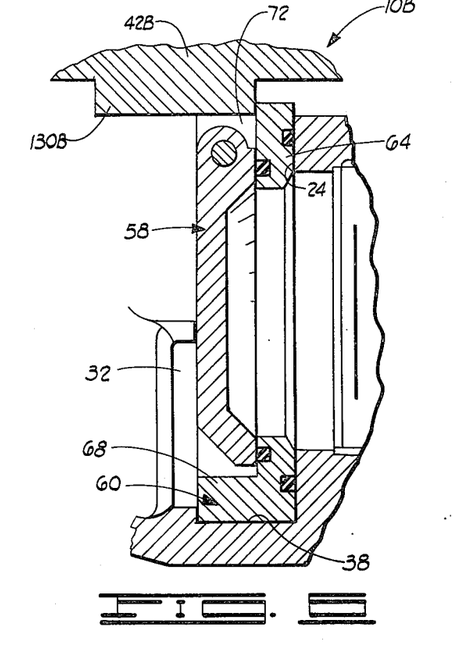
FIG. 6 is a partial cross section of a valve similar to the valve of FIG. 1 illustrating yet another modification of the bung of the valve for providing another manner of seating the valve module in the valve module cradle.

DESCRIPTION OF FIG. 6

Referring now to FIG. 6, shown therein is a partial cross section of a valve, designated 10B, having another modification of the bung, designated 42B in FIG. 6. As in the case of the modification shown in FIG. 5, other portions of the valve 10B are identical to corresponding portions of the valve 10 and have been numerically designated by numerals used to designate such portions in the description of the valve 10. In the valve 10B, only one circular protruberance, designated 130B is formed on the bung 42B to engage and seat the valve module 58 in the assembled valve 10B. As for the protruberance 130 in the valve 10A, the protruberance 130B in the valve 10B is formed on a diameter sufficient only to overlay the gap 72 in the clapper support portion 68 of the module body 60 of the valve module 58. The protruberance 130B engages portions of the clapper support portion 68 to either side of the gap 72 to seat the module body 60 in the valve module cradle and the circumference of the protruberance 130B engages portions of the seal portion 64 adjacent the gap 72 to provide additional axial support for the valve module 58 against the valve module sealing face 24 in the same manner that the protruberance 130 provides additional axial support for the valve module 58 in the valve 10A. The repair and operation of the valve 10B are the same as the repair and operation of the valve 10.

Figure 7:
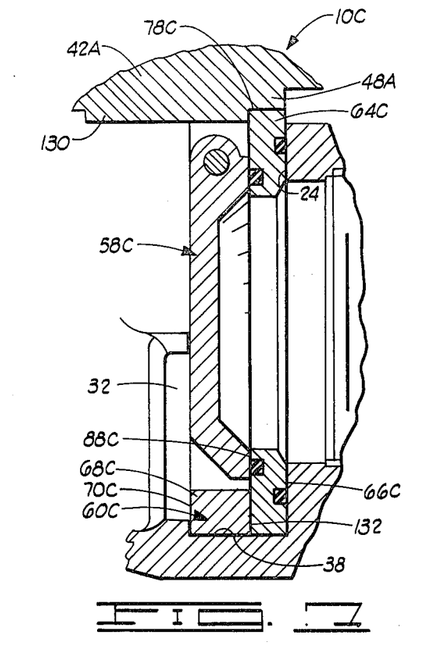
FIG. 7 is a partial cross section of a valve similar to the valve of FIG. 1 illustrating a second embodiment of the valve module and the manner wherein the bung seats the valve module.

DESCRIPTION OF FIG. 7

FIG. 7 is a partial cross section of a valve, designated 10C, incorporating a second embodiment of a valve module, designated 58C in FIG. 7. Other portions of the valve 10C are identical to corresponding portions of the valve 10A and have been given the same numerical designations as FIG. 5.

The valve module 58C differs from the valve module 58 in that the seal portion 64C of the module body 60C is constructed separately from the clapper support portion 68C in the manner of the valve assembly disclosed in the applicant's copending U.S. Patent Application, Ser. No. 14,124, filed Feb. 22, 1979, and entitled "An Improved Tilting Disk Check Valve". That is, the seal portion 64C and the clapper support portion 68C have the same shape as the seal portion 64 and the clapper support portion 68 of the module body 58 but the interior face 88C of the seal portion 64C extends to the outer periphery 78C of the seal portion 64C and an interior face 132 is formed on the clapper support portion 68C and engages the interior face of the seal portion 64C when the module body 60C is inserted in the valve module cradle. (Where the seal portion of the module body is formed separately from a clapper support portion, the first and second sides of the module body, such as the sides 66C and 70C in FIG. 7, will sometimes be referred to herein as exterior faces of the seal portion and the clapper support portion respectively.)

In order to seat the module body 60C in the valve module cradle, that is, to seat both the seal portion 64C and the clapper support portion 68C, the bung of the valve 10C is formed identically to the bung 42A of the valve 10A and has been so designated in FIG. 7. Thus, the valve module 58C is seated in the valve module cradle via the force exerted on the seal portion 64C by the circular protruberance 48A of the bung 42A of the valve 10C and the clapper support portion 68C is seated via a force exerted thereon by the protruberance 130 of the bung 42A of the valve 10C.

The repair of the valve 10C differs from the repair of the valves 10A and 10B in that the seal portion 64C and clapper support portion 68C are independently replaceable and are held together during insertion into the valve module cradle or are inserted separately thereinto. Otherwise, the replacement of the valve module 58C follows the same procedure as replacement of the valve module 58 in the valve 10. The operation of the valve 10C is the same as the operation of the valve 10.

Figure 8:
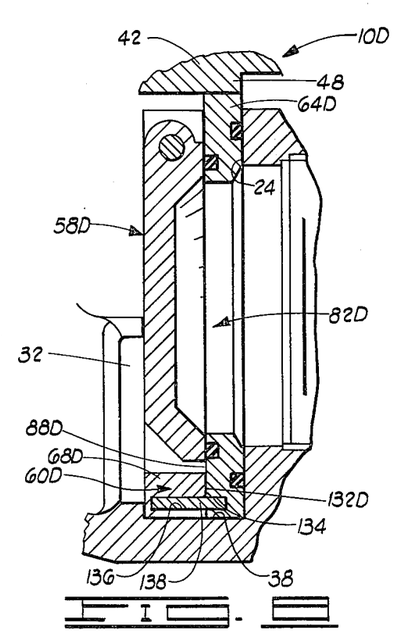
FIG. 8 is a partial cross section of a valve similar to the valve of FIG. 1 illustrating a third embodiment of the valve module and the manner wherein the bung seats the valve module.

DESCRIPTION OF FIG. 8

FIG. 8 is a partial cross section of a valve, designated 10D therein, showing another embodiment of the valve module, designated 58D in FIG. 8. Remaining portions of the valve 10D are identical to corresponding portions of the valve 10 and have been numerically designated by numerals used to designate such other portions in the description of the valve 10.

In the valve 10D, the seal portion 64D and clapper support portion 68D of the module body 60D are formed separately and are each seated in the valve module cradle to seat the module body 60D therein. The bung utilized for such seating is identical to the bung 42 of the valve 10 and has been numerically designated by numerals used for the bung 42 of the valve 10. Means are provided to cause seating of the clapper support portion 68D in the valve module cradle when the seal portion 64D is seated therein. Specifically, a hole 134 is formed in the seal portion 64D, the hole 134 intersecting the interior face 88D of the seal portion 64D and extending a distance into the seal portion 64D. Similarly, a hole 136 is formed in the clapper support portion 68D to intersect the interior face 132D of the clapper support portion 68D, the hole 136 extending a distance into the clapper support portion 68D. The holes 134 and 136 are parallel to the axis of the flow passage 82D through the module body 60D and are equidistantly spaced therefrom so that the holes 134 and 136 can be aligned when the seal portion 64D and the clapper support portion 68D are seated in the valve module cradle. A pin 138 is inserted in the hole 136 and extends therefrom so that the seal portion 64D can be pinned to the clapper support portion 68D by bringing the seal portion 64D against the clapper support portion 68D such that the pin 138 enters the hole 134 in the seal portion 64D.

The valve 10D is repaired and operates in the same manner that the valve 10C is repaired and operates. The force exerted on the seal portion 64D of the module body 60D is transmitted via the pin 138 to the clapper support portion 68D so that, when the module body 60D is placed in the valve module cradle, the portion 38 of the valve chamber wall forming a portion of the valve module cradle coaxially aligns the clapper support portion 68D and seating of the seal portion 64D via the protruberance 48 simultaneously seats the clapper support portion 68D via the connection between the seal portion 64D and the clapper support portion 68D provided by the pin 138. As will be clear to those skilled in the art, seating of the module body 60D can also be accomplished via a bung such as the bung 42B of the valve 10B.

Figure 9:
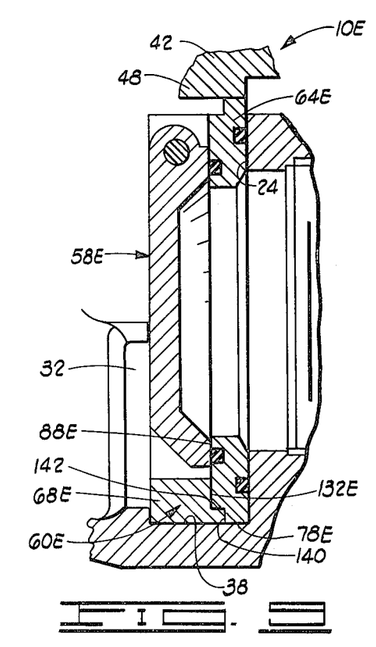
FIG. 9 is a partial cross section of a valve similar to the valve of FIG. 1 illustrating a fourth embodiment of the valve module and the manner wherein the bung seats the valve module.

DESCRIPTION OF FIG. 9

FIG. 9 is a partial cross section of a valve, designated 10E, showing another embodiment of the valve module, designated 58E in FIG. 8. Remaining portions of the valve 10E are identical to corresponding portions of the valve 10 and have been numerically designated by numerals used to designate such portions in the description of the valve 10.

In the valve 10E, the seal portion 64E and the clapper support portion 68E of the module body 60E are formed separately and, as for the module body 60D, means are provided for aligning the seal portion 64E with the clapper support portion 68E so that a bung 42, identical to the bung 42 in the valve 10 and bearing against the seal portion 64E, can be used to seat both the seal portion 64E and the clapper support portion 68E. In particular, a groove 140 is formed in the interior face 88E of the seal portion 64E, the groove 140 intersecting the periphery 78E of the seal portion 64E and extending circumferentially thereabout. A mating, axially extending flange 142 is formed on the interior face 132E of the clapper support portion 68E so that when the interior face 132E of the clapper support portion 68E engages the interior face 88E of the seal portion 64E, the flange 142 mates with the groove 140 to coaxially position the clapper support portion 68E on the seal portion 64E. Thus, when the protruberance 48 of the bung 42, identical to the bung 42 of the valve 10, bears against the seal portion 64E to seat the seal portion 64E in the valve module cradle, the force of the bung 42 against the seal portion 64E is transmitted via the groove 140 and flange 142 to simultaneously seat the clapper support portion 68E in the valve module cradle. As will be clear to those skilled in the art the valve module 58E can also be seated via a bung such as the bung 42B of the valve 10B.

The repair and operation of the valve 10E are the same as the repair and operation of the valve 10C.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. A tilting disc check valve, comprising:
   a valve module, comprising:
   a module body having a first side, a second side opposite the first side and a flow passage intersecting the first side and the second side and extending therebetween; and
   a clapper pivotally mounted on the module body adjacent the second side thereof for pivoting movement to a closed position wherein the clapper occludes the flow passage through the module body, the clapper comprising:
   a disc shaped portion; and
   a tab formed on the outer periphery of the disc shaped portion and extending substantially radially therefrom;
   a valve body having a valve chamber, an inlet passage opening to the valve chamber and an outlet passage opening to the valve chamber;
   wherein portions of the valve body about the opening of the inlet passage into the valve chamber form a valve module sealing face shaped to mate with the first side of the module body, wherein a module insertion port is formed through portions of the valve body disposed laterally of the valve module sealing face, wherein the valve body is characterized as having means forming a valve module cradle in the valve chamber and adjacent the valve module sealing face to mate with portions of the module body so as to position the first side of the module body against the valve module sealing face in the assembled valve, and wherein the module insertion port, the valve module cradle and portions of the valve chamber between the valve module cradle and the module insertion port are dimensioned to permit insertion of the valve module into the valve chamber via the module insertion port so as to seat the module in the valve module cradle; and means for closing the module insertion port; and wherein the module body comprises:

a clapper support portion extending from the second side of the module body to a medial portion thereof, the clapper support portion having the form of a portion of a ring having a diameter sufficient to receive the disc shaped portion of the clapper, the clapper support portion extending arcuately through a major portion of a circle so as to form a gap between portions thereof of a size sufficient to receive the tab of the clapper, the tab of the clapper extending into said gap and pivotally connected to the clapper support portion to pivotally mount the clapper on the module body, and the connection between the tab and the clapper support portion positioned so as to permit the disc shaped portion of the clapper to pivot into the clapper support portion of the module body; and a seal portion having the form of a ring and extending between the clapper support portion and the first side of the module body, wherein the seal portion is disposed coaxially with the clapper support portion in the assembled valve such that the inner peripheries of the seal portion and the clapper support portion form the flow passage through the module body, wherein the diameter of the seal portion is insufficient to receive the disc shaped portion of the clapper, and wherein portions of the clapper are shaped to mate with portions of the seal portion to occlude the flow passage when the disc shaped portion of the clapper is disposed within the clapper support portion of the module body.

2. The valve of claim 1 wherein the module insertion port is an internally threaded circular aperture and wherein the means for closing the module insertion port is a circular bung having external threads mating with the threads of said aperture.

3. The valve of claim 2 wherein a portion of the bung engages the module body in the assembled valve to retain the module body in a seated condition in the valve module cradle in the assembled valve.

4. The valve of claim 1 wherein the module body is formed unitarily.

5. The valve of claim 4 wherein the portion of the bung engaging the module body engages the outer periphery of the seal portion of the module body.

6. The valve of claim 5 wherein the diameter of the outer periphery of the clapper support portion of the module body is the same as the diameter of the outer periphery of the seal portion thereof; wherein the gap in the clapper support portion is positioned adjacent the bung in the assembled valve, whereby portions of the seal portion of the module body extend radially outwardly of the clapper support portion in a direction from the flow passage of the module body toward the bung; wherein the axis of the bung is offset from the module body in a direction away from the second side of the module body, whereby the clapper support portion of the module body is disposed nearer the axis of the bung than is the seal portion thereof; and wherein a circular protruberance is formed concentrically with the external threads of the bung on one side thereof to engage the seal portion of the module body.

7. The valve of claim 6 wherein a second circular protruberance is formed concentrically on the protruberance engaging the seal portion of the module body so as to engage portions of the clapper support portion of the module body near the gap therein, whereby the portion of the bung engaging the module body engages the seal portion thereof and the clapper support portion thereof.

8. The valve of claim 4 wherein the diameter of the outer periphery of the clapper support portion of the module body is the same as the diameter of the outer periphery of the seal portion thereof; wherein the gap in the clapper support portion is positioned adjacent the bung in the assembled valve, whereby portions of the seal portion of the module body extend radially outwardly of the clapper support portion in a direction from the flow passage of the module body toward the bung; wherein the axis of the bung is offset from the module body in a direction away from the second side of the module body, whereby the clapper support portion of the module body is disposed nearer the axis of the bung than is the seal portion thereof; and wherein a circular protruberance of a diameter insufficient to overlay the outer periphery of the seal portion of the module body in the assembled valve is formed concentrically with the threads of the bung, on one side thereof, to engage the clapper support portion of the module body.

9. The valve of claim 1 wherein the clapper support portion of the module body is formed separately from the seal portion thereof, the clapper support portion having an exterior face coincident with the second side of the module body and an interior face opposite the exterior face of the clapper support portion and the seal portion of the module body having an exterior face coincident with the first side of the module body and an interior face, mating with the interior face of the clapper support portion, opposite the exterior face of the seal portion; wherein the valve module cradle is shaped to align the clapper support portion of the module body coaxially with the seal portion thereof when the module body is seated therein; and wherein the portion of the bung engaging the module body engages the clapper support portion thereof and the seal portion thereof.

10. The valve of claim 9 wherein the diameter of the outer periphery of the clapper support portion of the module body is the same as the diameter of the outer periphery of the seal portion thereof; wherein the gap in the clapper support portion is positioned adjacent the bung in the assembled valve, whereby portions of the seal portion of the module body extend radially outwardly of the clapper support portion in a direction from the flow passage of the module body toward the bung; wherein the axis of the bung is offset from the module body in a direction away from the second side of the module body, whereby the clapper support portion of the module body is disposed nearer the axis of the bung than is the seal portion thereof; wherein a circular protruberance is formed concentrically with the threads of the bung on one side thereof to engage the outer periphery of the seal portion of the module body; and wherein a second circular protruberance, having a diameter insufficient to overlay the outer periphery of the seal portion of the module body, is formed on the protruberance engaging the outer periphery of the seal portion of the module body, and concentric therewith, to engage the clapper support portion of the module body.

11. The valve of claim 7, claim 8 or claim 10 wherein the protruberance engaging the clapper support portion of the module body engages a transversely extending portion of the seal portion to provide additional axial support for the module body against the valve module sealing face.

12. The valve of claim 1 wherein the clapper support portion of the module body is formed separately from the seal portion thereof, the clapper support portion having an exterior face coincident with the second side of the module body and an interior face opposite the exterior face of the clapper support portion and the seal portion of the module body having an exterior face coincident with the first side of the module body and an interior face, mating with the interior face of the clapper support portion, opposite the exterior face of the seal portion; wherein the portion of the bung engaging the module body engages one of the seal portion and clapper support portion thereof to seat said one of the seal portion and the clapper support portion in the valve module cradle; and wherein the module body is characterized as having means seating the other of the seal portion and the clapper support portion in the valve module cradle when said one of the seal portion and the clapper support portion is seated in the valve module cradle.

13. The valve of claim 12 wherein a hole is formed in the interior face of each of the seal portion and the clapper support portion of the module body equidistantly from the axis of the flow passage and wherein the means for seating the other of the seal portion and clapper support portion when said one of the seal portion and clapper support portion is seated in the valve module cradle comprises a pin disposed in the hole formed in the clapper support portion and extending into the hole formed in the seal portion.

14. The valve of claim 12 wherein the means seating said other of the seal portion and clapper support portion when said one of the seal portion and clapper support portion is seated in the valve module cradle is characterized as being a groove formed in the interior face of the seal portion of the module body, said groove intersecting the outer periphery of the seal portion and extending circumferentially thereabout, and an axially extending flange formed on the interior face of the clapper support portion to mate with the groove in the interior face of the seal portion.

15. The valve of claim 1, 2, or 3 wherein the means forming a valve module cradle is characterized as being an arcuate ridge formed along a portion of the interior surface of the wall of the valve chamber opposite the module insertion port and spaced a distance from the valve module sealing face.

16. The valve of claim 1, 4, 5, 6, 7, 8, 9, 10, 12, 13 or 14 wherein a groove concentric with the flow passage is formed in portions of the seal portion of the module body engaged by the disc portion of the clapper; wherein a groove concentric with the flow passage is formed in the first side of the module body so as to be overlayed by the valve module sealing face; and wherein the valve module further comprises:

an elastomeric sealing ring disposed in the groove in the portion of the seal portion of the module body engaged by the disc portion of the clapper, the disc portion of the clapper engaging the elastomeric ring in the closed position of the clapper; and an elastomeric ring disposed in the groove on the first side of the module body and engaging the valve module sealing face in the assembled valve.

* * * * *

UNITED STATES PATENT AND TRADEMARK OFFICE
CERTIFICATE OF CORRECTION

PATENT NO. : 4,252,144
DATED : Feb. 24, 1981
INVENTOR(S) : Domer Scaramucci

It is certified that error appears in the above—identified patent and that said Letters Patent is hereby corrected as shown below:

The term of this patent subsequent to October 28, 1997 has been disclaimed.

Signed and Sealed this

Fifth Day of May 1981

[SEAL]

Attest:

RENE D. TEGTMEYER

Attesting Officer

Acting Commissioner of Patents and Trademarks